June 27, 1933.  G. R. BOTT  1,915,287
ANTIFRICTION BEARING
Filed July 29, 1930   2 Sheets-Sheet 1
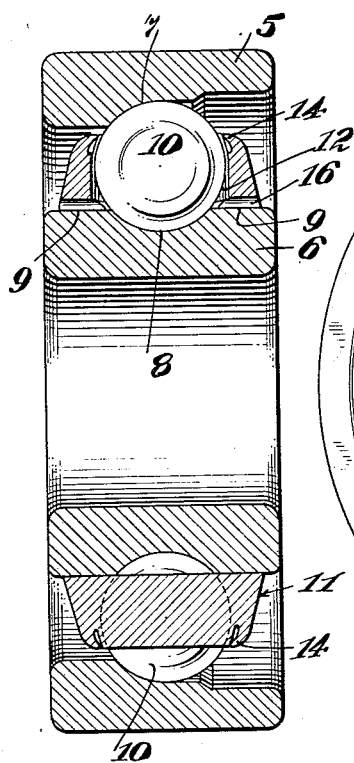
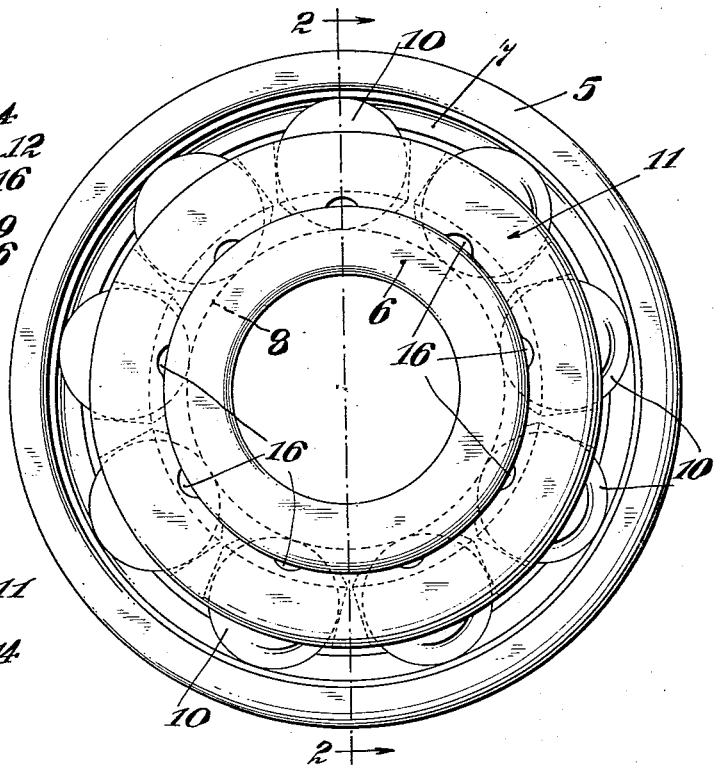
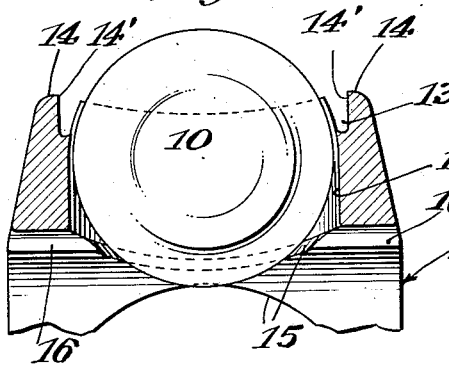
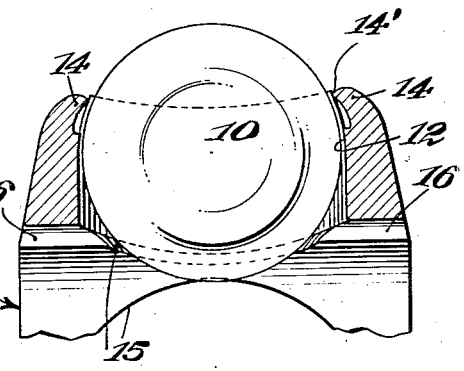
INVENTOR
George R. Bott
BY
C. P. Goepel
his ATTORNEY June 27, 1933. G. R. BOTT 1,915,287
ANTIFRICTION BEARING
Filed July 29, 1930 2 Sheets-Sheet 2
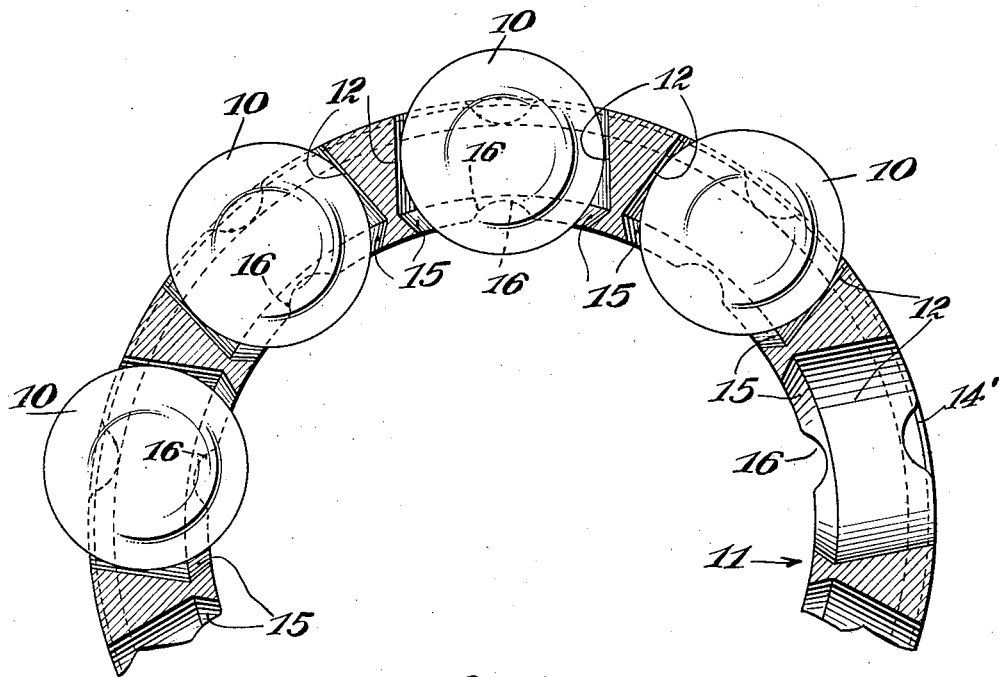
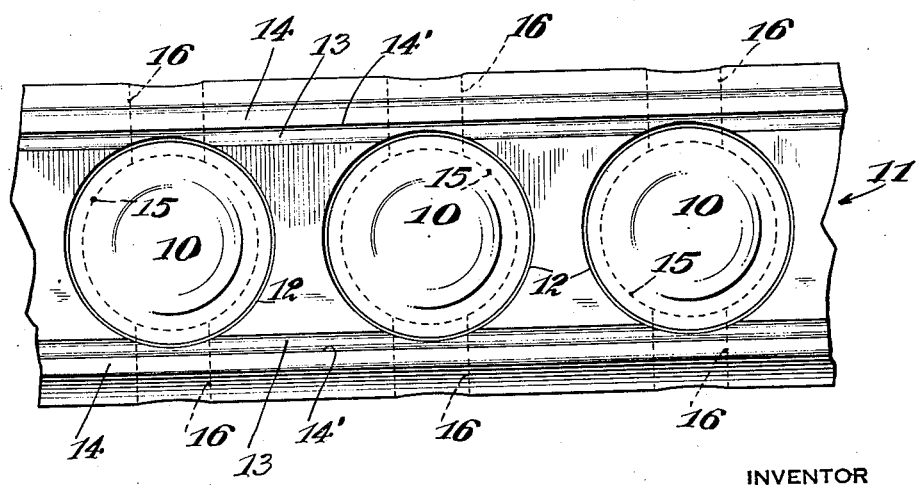
INVENTOR
George R. Bott
BY
his ATTORNEY Patented June 27, 1933

1,915,287

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

ANTIFRICTION BEARING

Application filed July 29, 1930. Serial No. 471,444.

This invention relates to anti-friction bearings, and more particularly to high speed ball bearings such as are required for the spindles of grinding machines, and other purposes wherein the spindles operate at a speed of approximately 20,000 revolutions per minute. Bearings of this type must be substantially constructed, and means provided for insuring an adequate supply of lubricant to all parts of the bearing.

It is the primary object and purpose of my present improvements to provide such a high speed anti-friction ball bearing having a one-piece balanced retainer for holding the balls in spaced relation between inner and outer bearing rings. One of the novel features of my present improvements is the provision of the one-piece retainer with means for holding or retaining the several bearing balls in the individual pockets of the retainer which will enable the retainer to be accurately manufactured at comparatively small cost while insuring the free rotation of each bearing ball around its own axis between the inner and outer bearing rings with a minimum of frictional resistance resulting in practical elimination of wear or distortion of the retainer structure.

It is also another important object of my invention to provide the retainer with means, which in cooperation with the inner bearing ring, produces a pumping effect in the operation of the device to draw the lubricating oil into the innermost confines of the bearing and effect its distribution to all of the load supporting surfaces thereof.

With the above and other objects in view, the invention consists in the improved anti-friction ball bearings, and in the form, construction and relative arrangement of its several parts, as will be hereinafter more fully described, illustrated in the accompanying drawings, and subsequently incorporated in the subjoined claim.

In the drawings, wherein I have disclosed one simple and satisfactory embodiment of the invention, and in which similar reference characters designate corresponding parts throughout the several views,—

Figure 1 is a side elevation illustrating one practical embodiment of my present invention;

Figure 2 is a diametrical sectional view taken on the line 2—2 of Fig. 1;

Figure 3 is an enlarged detail section through the retainer showing the normal form thereof before the bearing balls are finally locked in the retainer pockets;

Figure 4 is a similar sectional view illustrating the condition of the retainer, after the balls have been locked in the individual pockets;

Figure 5 is a circumferential sectional view through a part of the retainer, and Figure 6 is a fragmentary developed top plan view of the retainer.

Referring in detail to the drawings, 5 and 6 respectively, indicates the outer and inner annular members or rings of the bearing, the outer ring 5 being provided in its inner face with the continuous ball race 7 and the inner ring 6 being provided in its outer face with an opposing ball race 8. As shown, the invention is designed for application and use in connection with an open type bearing, the race 7 of the outer ring 5 being open at one side thereof so that the inner ring 6, together with the bearing balls and the retainer therefor may be assembled in cooperative relation with said outer ring.

The inner ring 6, at opposite sides of its race 8 has the outer surface or lands indicated at 9 highly finished or polished for the free rotation thereon of the ball retainer to be presently described.

The bearing balls 10 are held in spaced relation to each other for free axial rotation between and upon the races 7 and 8 by means of a one-piece retainer generally indicated at 11. This retainer, which is preferably of bronze is machined with a high degree of accuracy and is provided with the spaced ball receiving pockets indicated at 12. The retainer ring at opposite sides of the pockets 12 is provided in the outer side thereof with circumferentially continuous grooves or channels indicated at 13 thereby forming the flanges 14. It will be noted that the ring structure gradually tapers in thickness from its inner surface to the outer surface thereof so that the flanges 14 are relatively thin. The diameter of the ball receiving pockets 12 at the outer side of the retainer is somewhat greater than the diameter of the balls to be received therein so that said pockets at opposite sides thereof extend into the grooves 13 and adjacent to the inner side faces of the flanges 14 which normally extend substantially in radial planes.

At the inner side of each of the pockets 12, the retainer is formed with an annular inwardly inclined shoulder 15 having a diameter at the inner face of the retainer which is less than the diameter of the bearing ball so as to prevent inward movement of the ball from the pocket 12.

After the balls 10 have been placed in the several pockets 12 from the outer side of the retainer, the flanges 14 are displaced inwardly to extend over and substantially completely close the grooves or channels 13, and thereby also close the laterally open sides of the pockets 12. The edges 14' of the flanges 14 at the inner sides thereof are thus positioned so that the space between said edges is less than the diameter of the bearing ball 10, as clearly seen from reference to Fig. 4 of the drawings. Thus, outward movement of the ball from the pocket 12 is prevented. In this manner, the bearing balls are permanently held in the respective pockets against removal and together with the retainer constitute an assembled unit which may be readily applied in operative position between the bearing rings. It will be understood that there is sufficient radial play between the balls and the retainer to enable the balls to be properly engaged or seated in the race 8 of the inner ring 6 of the bearing. The inner diameter of the retainer is such that it will have a free riding fit upon the finished outer surfaces 9 of the ring 6. The clearance between these surfaces and the retainer is barely sufficient to insure adequate lubrication whereby wear will be prevented In addition to the above described feature of my improved retainer whereby the balls are locked in the respective pockets, I also provide the inner face of the retainer at the opposite side of each pocket with an axially extending groove 16 which extends from the inclined surface or shoulder 15 of the pocket to the outer side face of the retainer. The provision of these grooves 16, results in an automatic pumping effect in the operation of the bearing whereby the lubricating oil will be drawn inwardly from opposite sides of the retainer and distributed upon the innermost parts thereof where adequate and continuous lubrication is most essential. Thus, the bearing is enabled to satisfactorily operate at very high speeds for an indefinite length of time, without showing appreciable wear either of the ball races, or of the retainer or causing distortion of the latter.

The retainer is held against a gyrating motion by reason of the close riding contact of the inner surface of the retainer upon the lands 6 of the inner bearing ring whereby scoring of the surfaces of the anti-friction balls by contact of the retainer therewith will be obviated.

From the foregoing description considered in connection with the accompanying drawings, the several novel features of the retainer structure and the practical advantages thereof in the use of such bearings will be clearly understood. I have herein disclosed a practical embodiment of my present improvements which after prolonged tests, has given highly satisfactory results in actual use. However, it is possible that similar results might also be secured by resort to various alternative structures for that herein particularly described, and I accordingly reserve the privilege of resorting to all such legitimate changes in the form, construction and relative arrangement of the several parts as may be fairly incorporated within the spirit and scope of the invention as claimed.

I claim:

In an anti-friction bearing, the combination with inner and outer bearing rings having raceways in their opposed faces, and balls intermediate the faces, of an annular retainer comprising a plurality of spaced ball receiving openings therein, upper flanges on the lateral peripheral marginal edges of the upper ends of each opening, set inwardly to extend over the outer portion of each ball, to limit its outer movement, inclined shoulders on the lower ends of each opening to limit the inward movement of each ball, said upper flanges and lower shoulders forming with the openings in the retainer, pockets for the balls, and axial grooves in the lower part of the retainer body below the upper flanges and in the radial axis of each ball pocket, disposed between the lower inclined shoulders, said grooves being in communication with the pockets for supplying lubricant to the balls during their rotation in the pockets.

In testimony that I claim the foregoing as my invention, I have signed my name hereto.

GEORGE R. BOTT.